UNITED STATES PATENT OFFICE.

ALBERT H. LOW, OF DENVER, COLORADO.

EXTRACTION OF ZINC FROM ORES.

SPECIFICATION forming part of Letters Patent No. 387,688, dated August 14, 1888.

Application filed August 29, 1887. Serial No. 248,169. (No specimens.)

*To all whom it may concern:*

Be it known that I, ALBERT H. LOW, a citizen of the United States, and a resident of Denver, Arapahoe county, Colorado, have invented certain new and useful Improvements in the Extraction of Zinc from Ores, of which the following is a specification.

Many of the native ores containing gold, silver, lead, and other valuable metals contain zinc compounds and silica in such large quantities as to be a serious detriment to the smelting operations. In order to better such ores by the elimination of these objectionable materials, my invention relates to improvements in the methods of extracting zinc and silica from ores and furnace products in order to render them in a more desirable condition for smelting purposes; and it further relates to the process of recovering the extracted zinc in a form suitable for utilization in the production of metallic zinc and the manufacture of marketable zinc compounds; and the object of my invention is to render these processes simple, cheap, and effective, so that the refractory ores may be made more submissive to the usual smelting processes, and the zinc products obtained thereby produced in a marketable condition; and my invention consists in the process, substantially as hereinafter pointed out, for attaining these objects.

My invention is based upon the fact that an aqueous solution of sulphurous-acid gas is a powerful solvent for certain compounds of silica, among which is the silicate of zinc, and for the oxide and certain other compounds of zinc, and also upon the fact that a strong solution so obtained can be made to precipitate a considerable portion of its zinc as an insoluble compound by simply boiling to expel a portion of the sulphurous-acid gas. The remainder of the zinc in the solution may be recovered by a complete evaporation of the solvent, or by the use of a suitable precipitant.

I will now describe one way of carrying out my invention and utilizing these principles, although it is to be understood that the invention is not limited to the use of any specific apparatus, nor to the specific manner of carrying it out set forth hereinafter, as its details may be varied by those skilled in the art according to the requirements of different cases. The ore to be treated is first finely comminuted or crushed, and if its zinc contents are not already in an oxidized condition the ore is well roasted in any usual and suitable manner in order to convert as much of the zinc as possible into the condition of oxide of zinc. This roasting operation also causes more or less of the silica contained in the ore to unite with the metallic oxides to form basic silicates, which are soluble in weak acids, and of which the silicate of zinc is one, which latter is readily soluble in an aqueous solution of sulphurous acid gas. The crushed oxidized ore is then placed in any suitable receptacle and leached with a solution of sulphurous acid, and I have found the following to be a convenient and practical manner of doing so.

It is well known that in some of the ordinary smelting operations sulphurous-acid gas is thrown off as a waste product in annoying abundance. I utilize this gas by making suitable connections with a flue, stack, or other source of gas connected with a smelting-works and convey the sulphurous-acid gas, if necessary, by the use of pressure or suction, to any convenient point, where it is brought in contact with water, which may be either in the form of a spray or jet, or in bulk, or in any other of the well-known arrangements to cause absorption of the gas. The combined gas and water are then made to percolate through the ore. The leach-liquor thus obtained is then again passed through the vat as many times as may be necessary, and each time in conjunction with a fresh supply of sulphurous-acid gas, until the liquor is considered sufficiently charged with the zinc, when this liquor is removed and the operation continued as before with a fresh supply of water. This leaching is carried on at a comparatively low temperature—that is, without artificially heating the ore or leach-liquor, as such heating would cause a precipitation of the sulphite of zinc contained in solution, while it is desirable that as large quantities thereof as possible should be carried off. The leaching process is thus continued until a test shows the zinc to be sufficiently extracted from the ore, when the ore is removed and replaced by a fresh portion. Sometimes it is found desirable before the ore is sufficiently exhausted of its zinc contents to again roast it and submit it to the leaching operation, as this facilitates the ready removal of the zinc. While the removal of the zinc is thus made the main object, there is incidentally removed also a considerable amount of silica, which dissolves in the sulphurous acid solution. This greater or less removal of the silica is of great benefit to the ore under treatment.

The leach-liquor derived in the manner substantially as above indicated may then be deprived of a portion of its zinc, as follows: It is placed in a suitable receptacle and evaporated or boiled as much as may be deemed desirable to expel a portion of the sulphurous-acid gas, and by this means a considerable portion of the zinc is rendered insoluble and is precipitated in sandy grains or crystals of sulphite or sub-sulphite of zinc. The mother-liquor may now be drained off or further evaporated or treated with a suitable precipitant in a manner well known, to obtain, if desired, the remainder of the zinc. This second product is usually not as pure as the first, and may require purification in any of the well-known ways, and the products thus obtained may be utilized in the production of metallic zinc or in the manufacture of zinc compounds. It will thus be seen that I make use of one of the ordinary waste products from smelting-works—that is, sulphurous-acid gas—in extracting the zinc and silica from the ore, and I am thereby enabled to produce the zinc in a very cheap and simple manner and to render the ores in a better condition for the ordinary smelting process.

While I have described my process as applied to ores, it is equally applicable to certain furnace products and other material containing zinc.

I am aware that it has been proposed to extract copper and iron from ores containing precious metals by calcining such ores to reduce the copper and iron to oxides, which calcined ores are reduced to a powder and then while heated in tanks subjected to the action of sulphurous acid, and hence I lay no claim to such a process; but my invention differs therefrom, first, in that my process is for extracting zinc, and, second, in that I leach the calcined ore with the sulphurous acid while the former is not heated, as I have found heat at this stage of the process to be injurious, in that it tends to precipitate the sulphite of zinc, and I have found that by my process any copper which may be contained in the ore is scarcely affected at all.

I am also aware that it is not new to treat calcined blend or sulphite of zinc with dilute sulphuric acid to form sulphate of zinc; but my process differs from this, in that I use the sulphurous gases as they are given off directly from the furnaces, without the intermediate step of converting them into sulphuric acid, and in that the principal product of zinc which is obtained by my process is the sulphite instead of the sulphate.

What I claim is—

1. The herein described process of extracting zinc from ores containing precious metals, consisting in leaching the ore at a low temperature with an aqeous solution of sulphurous-acid gas, substantially as described.

2. The herein-described process of extracting zinc from ores containing precious metals, consisting in leaching the ore with an aqueous solution of sulphurous-acid gas to dissolve out the zinc, and then boiling the leached liquor to expel the sulphurous acid gas and cause a precipitation of the zinc, substantially as described.

In testimony whereof I have signed my name to this specification in the presence of two subscribing witnesses.

ALBERT H. LOW.

Witnesses:
SAM S. LANDON,
WEBSTER D. ANTHONY.